Figure 1:
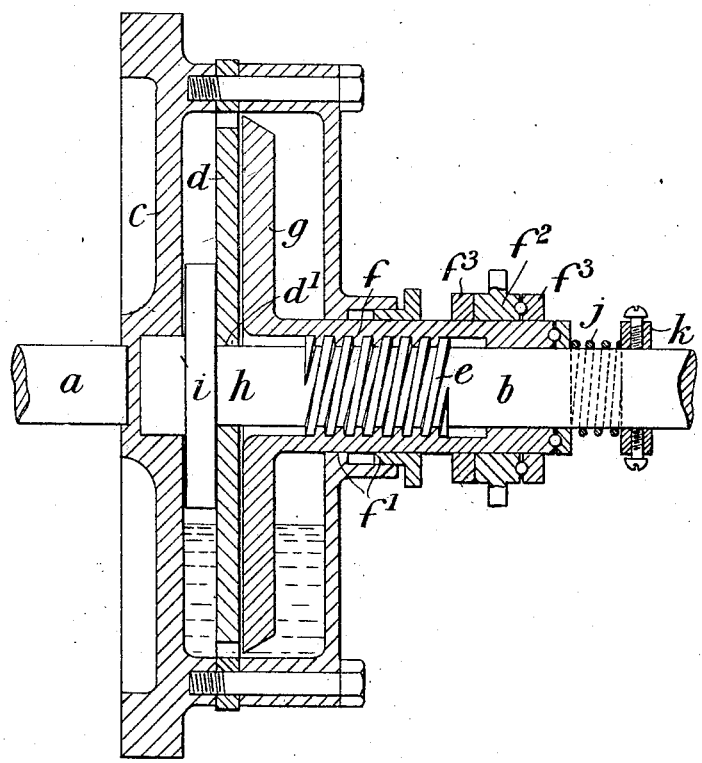

C. TUCKFIELD.
FRICTION CLUTCH.
APPLICATION FILED AUG. 27, 1908.

936,190.

Patented Oct. 5, 1909.
2 SHEETS—SHEET 1.

Witnesses
C. G. Redfern
E. E. Dabbs

Inventor
Charles Tuckfield

C. TUCKFIELD.
FRICTION CLUTCH.
APPLICATION FILED AUG. 27, 1908.
936,190.
Patented Oct. 5, 1909.
2 SHEETS—SHEET 2.
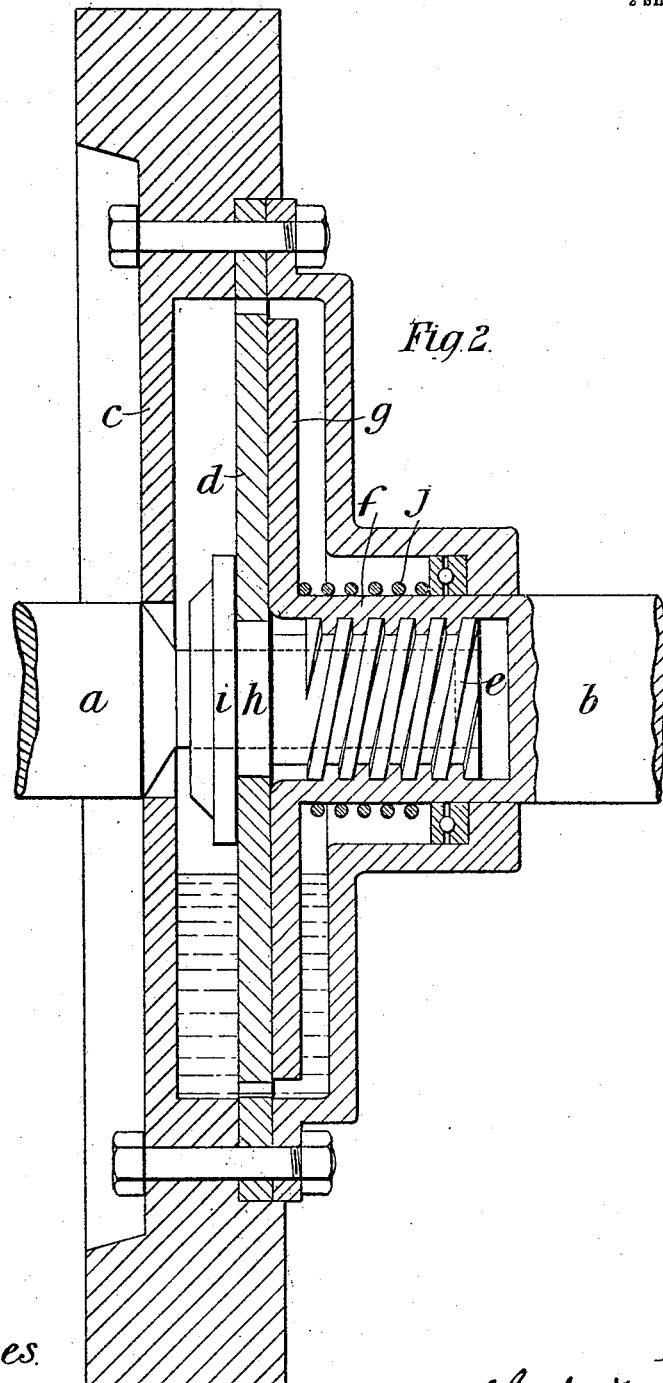
Witnesses
C. G. Redfern
E. E. Dabbs
Inventor
Charles Tuckfield

UNITED STATES PATENT OFFICE.

CHARLES TUCKFIELD, OF EAST MOLESEY, ENGLAND.

FRICTION-CLUTCH.

936,190. Specification of Letters Patent. Patented Oct. 5, 1909.

Application filed August 27, 1908. Serial No. 450,488.

*To all whom it may concern:*

Be it known that I, CHARLES TUCKFIELD, a subject of the King of Great Britain, residing at 4 Thames View, East Molesey, Surrey, England, have invented a new and useful Improved Friction-Clutch, of which the following is a specification.

My invention relates to friction clutches of the type described in the specification of Tuckfield and Garland's British Patent No. 11329 of 1906.

The chief objects of the present invention are to provide greater frictional contact between the opposing members of the clutches and to avoid the end thrust which is occasioned by the screwing action of the idle member in this type of clutch.

According to my invention I extend the screwed spindle which is either formed upon or engages with the driven shaft and controls the idle clutch member and I provide the extended portion of the screwed spindle with a flange or the equivalent, the said flange being designed to engage with the opposing clutch member or with a plate attached thereto on that face which is opposite to the face with which the idle member makes contact. With this construction, when the clutch is put into operation, the aforementioned flange is drawn into frictional contact with the rotating clutch member or with the plate attached thereto which is thereby gripped on either side, that is to say, on the one side by the flange and on the other side by the idle member of the clutch. It will, therefore, be obvious that not only is the frictional contact greater than as is the case with clutches of this type as hitherto made but that the injurious effect of the end thrust set up by the screwed spindle is obviated.

To enable the invention to be fully understood, I will describe it by reference to the accompanying drawings, in which:—

Figure 1 is a sectional elevation of one form of clutch made according to the invention, and Fig. 2 is a similar view illustrating a modification.

Referring first to the construction of clutch shown in Fig. 1, $a$ represents the driving shaft and $b$ the driven shaft, the driving shaft $a$ having mounted upon it the casing $c$ which serves as an oil bath and which is fitted internally with the plate $d$. The driven shaft $b$ has formed upon it the screwed spindle $e$ which engages with an internally screw-threaded sleeve $f$ provided with the plate $g$; the plate forms the idle clutch member and lies adjacent to the aforementioned plate $d$ forming the rotating clutch member. The screwed spindle $e$ is, as above described, extended in length as shown at $h$, and passes through the central opening $d'$ formed in the plate $d$, its projecting end carrying the flange $i$. The sleeve $f$ is carried in the bearing $f'$ and a spiral spring $j$ coiled around the shaft $b$ bears at one end against the collar $k$ keyed upon the said shaft, and at the other end against the outer end of the said sleeve $f$ so as to normally tend to press the same in the direction of engagement with the clutch plate $d$. $f^2$ is a collar loose on the sleeve $f$ but confined between two collars $f^3$ fixed to the said sleeve, the collar $f^2$ being designed to hold the plate $g$ out of contact with the plate $d$ by means of a forked lever not shown.

The clutch operates as follows; that is to say, when the sleeve $f$ is released by the forked lever, the spring $j$ forces forward the idle clutch member $g$ (the pitch of the screw $e$ allowing of this) into contact with the rotating clutch plate $d$, the said member in its movement turning upon the screw $e$. The friction set up between the said plate $d$ and the member $g$ has the tendency to still further turn the member $g$ on the screw $e$, but this turning movement is prevented by the contact of the flange $i$ with the rear surface of the clutch plate $d$ so that the result is that the member $g$ is pressed more forcibly against the clutch-plate $d$ and at the same time the injurious effect of the end thrust which, as mentioned above, accompanies this type of clutch as hitherto constructed, is obviated.

The form of clutch illustrated in Fig. 2 is similar to that shown in Fig. 1, the difference being that the driven shaft $b$ is formed as the continuation of the sleeve $f$ instead of as a continuation of the screwed spindle $e$, the spring $j$ being consequently coiled around the said sleeve within the casing $c$. The action of this form of clutch is the same as that hereinbefore described.

Having now particularly described and ascertained the nature of my said invention and in what manner the same is to be performed, I declare that what I claim is:

1. In a friction clutch, the combination with a rotating member, of an idle member comprising two parts located on opposite sides of the rotating member, and one of which is rigid with the driven shaft, a screw connection between the two parts of the idle member, a spring for normally holding one part of the idle member in contact with the rotating member so as to draw the said two parts toward one another to grip the rotating member, and means for withdrawing the contacting idle member from the rotating member, substantially as described.

2. A friction clutch comprising a rotating member keyed upon the driving shaft, an idle member which engages a screw thread upon the driven shaft, an extension upon the driven shaft through the idle member, a flange upon the said extension, means such as a spring for holding the idle member in engagement with the rotating member, and means for withdrawing the said two members from contact, substantially as described.

CHARLES TUCKFIELD.

Witnesses:
C. G. REDFERN,
E. E. D/BBS.